Aug. 5, 1930.  F. GRUNWALD  1,772,099
FRUIT CRUSHER
Filed Oct. 29, 1927  2 Sheets-Sheet 1
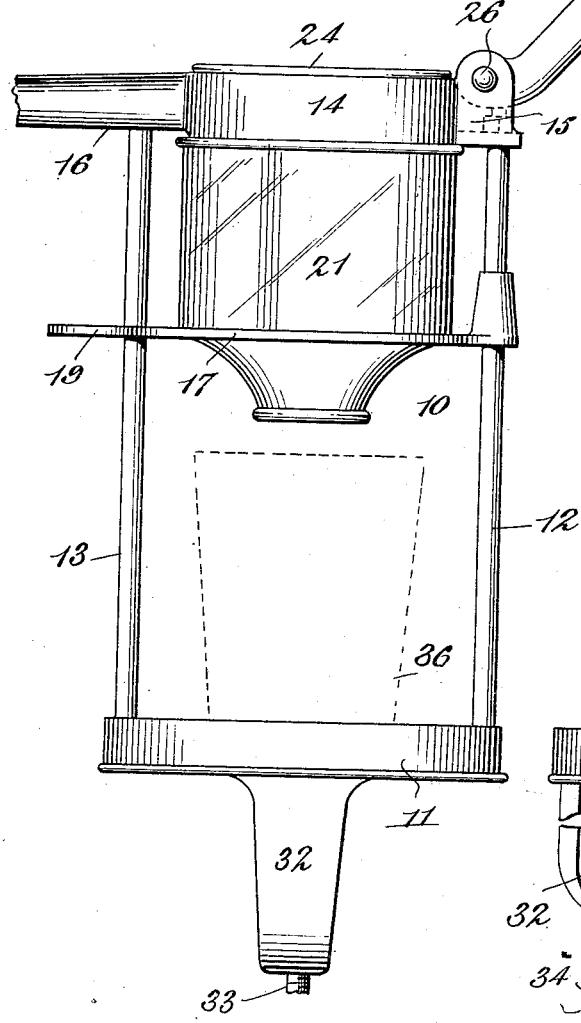
Fig.1.
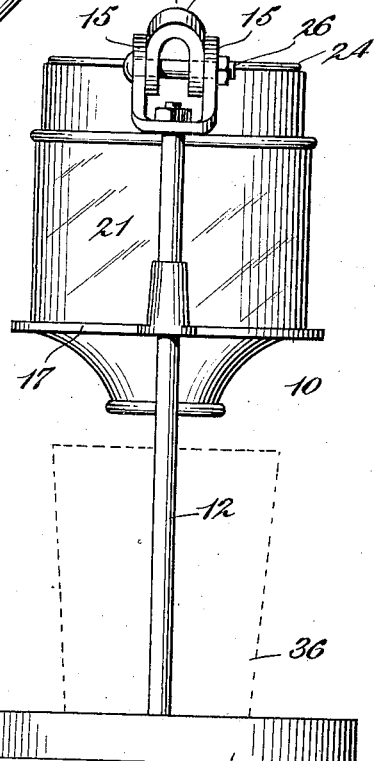
Fig.2.
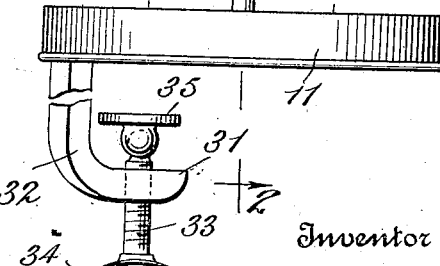
Inventor
Fannie Grunwald.

Aug. 5, 1930.  F. GRUNWALD  1,772,099
FRUIT CRUSHER
Filed Oct. 29, 1927  2 Sheets-Sheet 2

Inventor
Fannie Grunwald.

Patented Aug. 5, 1930

1,772,099

UNITED STATES PATENT OFFICE

FANNIE GRUNWALD, OF BROOKLYN, NEW YORK, ASSIGNOR OF ONE-HALF TO JOSEPH CARDINAL, OF BROOKLYN, NEW YORK

FRUIT CRUSHER

Application filed October 29, 1927. Serial No. 229,683.

This invention relates to improvements in fruit crushers.

The primary object of the invention resides in a fruit crusher for crushing citrous fruits such as oranges, lemons, grapes and the like for recovering and straining the juices into a glass or other receptacle.

Another object of the invention is to provide a fruit crusher for use in squeezing the juices directly into a glass for the making of fruit juice beverages and which will be found most useful at soft drink stands and fountains.

A further object is the provision of a fruit crusher in which the juices are separated from the pulp by placing the fruit to be crushed into a foraminated cylinder and applying pressure upon a plunger operable therein, the cylinder being supported within a hopper into which the fruit juices flow, the pulp remaining in the cylinder which is removably supported for facilitating the disposal of the pulp.

A still further object is to provide a fruit crusher which is simple of construction, easy to attach to a supporting structure and to operate when in an attached position, and highly sanitary as the parts are so arranged that they may be thoroughly cleaned.

With these and other objects in view, the invention resides in certain novel construction and combination and arrangement of parts, the essential features of which are hereinafter fully described, are particularly pointed out in the appended claims, and are illustrated in the accompanying drawing, in which :—

Figure 1 is a side elevation of my improved fruit crusher with the actuating handle swung to the limit of its upward movement.

Figure 2 is a rear elevation of the same with the handle in a lowered position.

Figure 4:
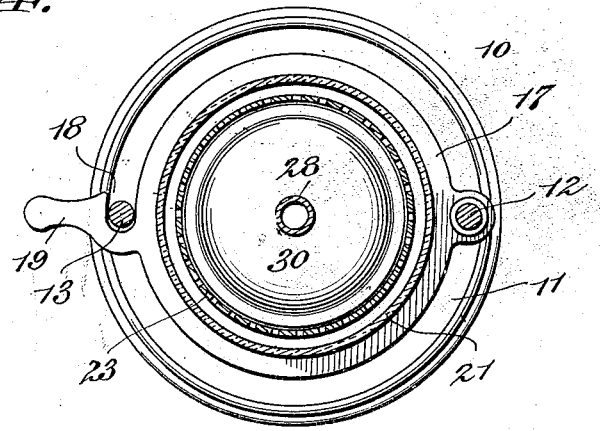
Figure 4 is a horizontal sectional view on the line 4—4 of Figure 3.
Figure 3:
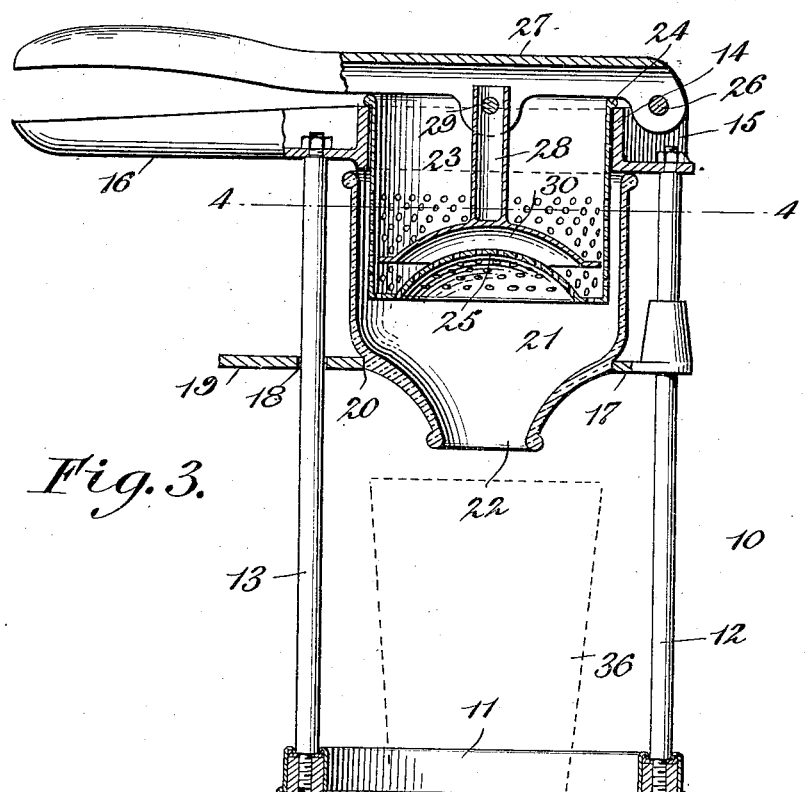
Figure 3 is a vertical longitudinal sectional view therethrough.

Referring to the drawings, the reference numeral 10 designates my improved fruit crusher in its entirety, which includes a base or platform 11 from which diametrically opposed posts or standards 12 and 13 rise and removably support an annular ring 14 at the top thereof. The ring is cast and has spaced ears 15 formed on one side thereof and a stationary hand grip 16 extending from the opposite side thereof.

Pivotally mounted upon the post 12 at a suitably spaced distance above the platform 11 is a bracket 17 having a notch or slot 18 therein for receiving the post 13 when the bracket is swung to an operative position. The closed end of the slot 18 limits the swinging movement of the bracket in one direction for axially aligning the same with the ring 14 for a purpose to be presently explained. A handle 19 extends from the bracket and by which it may be swung about its pivot. The bracket has a central opening 20 therein, the walls of which serve as a seat for a glass hopper 21 having an enlarged open top and a restricted open neck or discharge end 22.

Suspended from the ring 14 and depending into the hopper 21 in spaced relation to the walls thereof is a foraminated cylinder or strainer 23 having an annular bead 24 extending about its top open edge and which rests upon the ring. The cylinder is uniform throughout its length and has a concavo-convex bottom 25, the convex side extending within the cylinder and against which the fruit to be crushed is pressed.

Pivoted as at 26 between the ears 15 is an actuating handle 27 having a plunger rod 28 pivoted thereto as at 29 and which has its free end provided with a plunger head 30 having a concavity in its underside approximating the curvature of the fruit to be crushed such as a half an orange or lemon placed with its flat cut side down upon the convex side of the bottom of the strainer.

For the purpose of attaching the device to a supporting structure such as a table or counter, I provide a clamping means 31 which includes an angularly bent bracket 32 extending from the base 11 and which has a threaded opening for threadedly receiving a screw 33 having a finger grip 34 on one end and a swivel head 35 on its opposite end. The device is attached to a supporting surface by slipping the base 11 over the edge of the same and tightening the clamping screw 33 against the underside thereof. For household use, the device may be set up for use and taken down when not in use and stored away.

In operation, the operator cuts the orange, lemon or other like fruit in half and with the lever held in an upward position with the plunger out of the cylinder, places the half of fruit into the cylinder in a manner already mentioned. The glass shown in dotted lines at 36 is placed upon the base 11 and the lever 27 swung downward with the plunger head 30 within the cylinder. The operator grasps the two levers 16 and 27 by which a strong grip may be obtained, causing the plunger head to press the fruit against the convex bottom of the strainer. During the pressing operation, the fruit juices pass through the openings in the foraminated cylinder and into the glass hopper from where they flow through the open neck 22 into the glass 35 disposed therebeneath. The pulp and peel of the fruit remain in the strainer 23 and are removed by swinging the lever 27 upward and lifting the strainer or cylinder from its supporting ring 14. For cleaning purposes, the glass hopper 21 may be removed from its support by removing the cylinder in the manner just explained, after which the bracket 17 is swung about its pivot so as to clear the vertical plane of the ring 14. When swung to such position, the hopper may be lifted from its seat and thoroughly washed.

When used at drink counters, the lever 27 may be kept in an upward position when not in use as shown in Figure 1 of the drawings, and an orange or the like 37 placed upon the concavity in the plunger head 25, as the plunger head may be swung to rest against the lever. This is merely a means for supporting the fruit to be crushed and for display purposes.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A fruit crushing device comprising a hopper having a reduced outlet spout, means for supporting said hopper to enable a receptacle to be placed beneath said outlet spout, a ring fixedly supported above said hopper and provided with a projecting stationary handle, a foraminated cylinder open at its top and having a convex bottom fitting within said ring and depending into said hopper in spaced relation to the walls thereof, a peripheral bead on the exterior open end of said cylinder resting upon said ring, a lever pivoted to said ring and provided with a handle portion for swinging movement in the same vertical plane as said stationary handle, and a plunger embodying a rod pivoted to said lever and a head carried thereby having a concavity therein and movable within said foraminated cylinder.

2. In a fruit pressing device, a base, posts rising from said base, a ring member supported at the tops of said posts and adapted to support fruit pressing means, a bracket pivoted to one of said posts and having an opening therein, the walls of which constitute a seat, said bracket having a notch for receiving the other post for limiting swinging movement of said bracket in one direction to axially align the opening therein with said ring, and a hopper seated on said seat and provided with a reduced outlet neck extending through said opening and adapted to receive and confine the fruit juices adapted to be squeezed therein for dispensing into a receptacle held beneath said outlet neck.

Signed at Brooklyn, in the county of Kings and State of New York this 28th day of October A. D. 1927.

FANNIE GRUNWALD.